ance. Hydrogenated elastomers prepared from the higher Mooney starting materials, e. g., polymers having Mooney values ranging from 35 to 60 and higher, not only have excellent extrusion and molding characteristics but they have higher tensile strength and improved oil resistance and still retain their good low temperature properties. These characteristics make them particularly desirable for use in wire coatings, production of fibers, filaments, films, sheetings, etc., as well as for various molded articles such as dishes, containers, toys, gaskets, and the like. The improved plasticity of thermoplastic resins prepared in accordance with the method of this invention is shown by reference to Example III, and the drawing, which shows plasticity plotted against temperature. The curve designated as No. 1 represents a sample of hydrogenated polybutadiene rubber prepared according to the method of this invention. It was subjected to a hot milling operation prior to being hydrogenated. The material was free flowing over a wide temperature range and could be extruded readily to give a product having a smooth, uniform surface. The curve designated as No. 2 represents a sample prepared by hydrogenation of a 10 Mooney polybutadiene. This very soft polymer had good plasticity and extrusion properties without being milled prior to hydrogenation. The curve designated as No. 3 represents a sample of hydrogenated polybutadiene which was not hot milled prior to hydrogenation. The polybutadiene employed as a starting material was the same as that used for the sample from which curve No. 1 was obtained. The plasticity of this sample was not as good and the extruded material had a very rough, uneven surface.

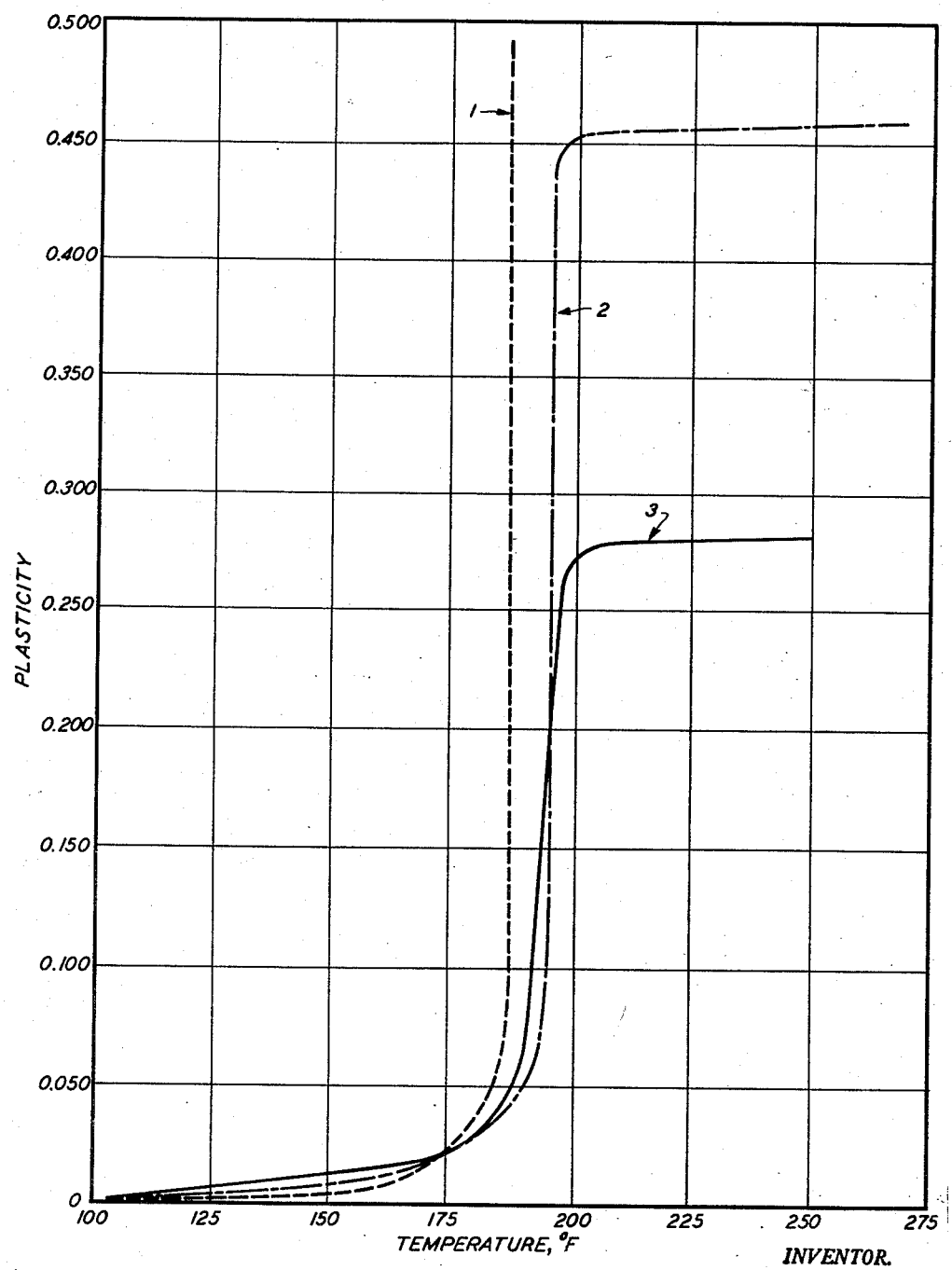

United States Patent Office 2,693,461
Patented Nov. 2, 1954

2,693,461

SYNTHETIC ELASTOMER HYDROGENATION PROCESS

Rufus V. Jones, Bartlesville, Okla., assignor to Phillips Petroleum Company, a corporation of Delaware Application August 18, 1952, Serial No. 304,912

8 Claims. (Cl. 260—83.5)

This invention relates to an improved synthetic elastomer hydrogenation process. In a further aspect this invention relates to a process for producing hydrogenated synthetic elastomers having a high degree of hydrogenation. In a further aspect this invention relates to hydrogenated synthetic elastomers having improved extrusion and molding characteristics.

I have discovered that hydrogenated synthetic elastomers having these improved characteristics are produced by a method which comprises subjecting the elastomer to a hot milling step prior to the hydrogenation reaction. This process provides hydrogenated products which can be extruded and molded with smooth surfaces in distinction to the prior products which usually have rough surfaces. My process also makes possible the utilization of high Mooney starting materials. The hydrogenated products of my invention have the low temperature characteristics which have been obtained previously with hydrogenated polymers.

Each of the following objects is attained by at least one of the aspects of this invention.

An object of this invention is to provide a process for the hydrogenation of synthetic elastomers. A further object of this invention is to provide a process for this hydrogenation in which it is possible to obtain higher degrees of hydrogenation than usually obtained by the prior methods. A further object of this invention is to provide a method for producing hydrogenated synthetic elastomers which can be readily extruded and molded with smooth surfaces.

Other objects and advantages will be apparent to one skilled in the art upon reading this specification.

The drawing which accompanies and is a part of the present specification illustrates plasticity curves for three hydrogenated synthetic elastomers, curve 1 being a hydrogenated elastomer produced according to the method of my invention, curve 2 showing the plasticity of a low Mooney hydrogenated synthetic elastomer, and 3 illustrating the plasticity curve for a synthetic elastomer which has been hydrogenated but not treated according to the process of this invention.

Thermoplastic materials can be readily obtained by the hydrogenation of synthetic elastomers such as polybutadiene, polyisoprene, butadiene-styrene copolymers, and the like. The products are valuable for the production of various molded articles, coating materials, protective coverings, films, fibers, filaments, sheeting, tubing, gaskets, etc. They have excellent low temperature properties and can therefore be employed for the manufacture of articles to be used in Arctic service or under conditions where extremely low temperatures are encountered. However, in many instances difficulties are encountered in the production of extruded or molded articles from hydrogenated synthetic elastomers. The surfaces are often rough. It has frequently been noted that polymers of very low Mooney values give hydrogenated products which have good extrusion and molding characteristics but as the Mooney values are increased the resulting hydrogenated materials have a tendency toward rough surfaces when they are extruded. Thermoplastics which behave in this manner are said to have a memory, i. e., they tend to return to their original shape after being extruded or molded.

When operating according to the process of the present invention, products are obtained which have improved plasticity and can be molded and extruded to give articles having smooth surfaces which are uniform in appearance. Hydrogenated elastomers prepared from the higher It is a further advantage of this invention that synthetic elastomers having low as well as high Mooney values can generally be hydrogenated to a greater extent under a given set of conditions than can the same elastomers which have not been subjected to a hot milling step prior to hydrogenation.

According to the process of this invention a synthetic elastomer is subjected to a hot milling operation at a temperature generally in the range between 200° and 600° F., preferably below 350° F., for a period in the range between 5 and 120 minutes and generally between 10 and 60 minutes. A two stage milling operation is frequently desirable and, in such a case, a higher temperature is used during the final stage of milling. Substantially no change is noted in the inherent viscosity of the polymer as a result of this hot milling operation. The resulting elastomer, which has previously been rendered substantially free from salts or other materials which might act as hydrogenation catalyst poisons, is charged to a hydrogenation reactor in the form of a solution or dispersion in a suitable solvent, the hydrogenation catalyst is added, and hydrogen is introduced into the reactor until the desired pressure is reached. The reactor contents are then heated to the level employed for effecting hydrogenation and maintained at this level until the reaction has proceeded to the desired degree.

Hydrogenation catalysts which are preferably used in practicing the present invention are nickel-kieselguhr, Raney nickel, copper chromite, molybdenum sulfide, finely divided platinum, finely divided palladium, platinum oxide, copper chromium oxide, and the like. It is usually preferred to employ a nickel-kieselguhr catalyst having a reduced nickel content of from 30 to 80 weight per cent. The amount of catalyst employed is preferably in the range from 1 to 100 weight per cent of the elastomer. With highly active hydrogenation catalysts, such as nickel supported on kieselguhr, 2 to 20 weight per cent of catalyst gives a desirable rate of hydrogenation.

The solvent or dispersion medium is one which is preferably inert to hydrogenation, such as saturated cyclic hydrocarbons, including cyclohexane, methylcyclohexane and the like. Aromatic hydrocarbons, cyclic ethers and paraffin hydrocarbon solvents, such as benzene, toluene, isooctanes, isoheptanes, normal heptane, dioxane, and the like, preferably boiling above atmospheric temperature can be used if desired. Aromatic solvents can be hydrogenated concomitantly with the synthetic elastomer, and the resulting solvent can be recycled and used. A mixture of solvents and/or dispersers can be used if desired. Following hydrogenation the catalyst is removed, preferably by magnetic separation according to the method of Jones and Moberly described in copending application Serial No. 270,944, filed February 11, 1952, although filtering, centrifuging, or the like can be used where applicable. The product is generally recovered by drum drying or stripping the solvent in vacuo.

The above described hydrogenation process is more fully described in copending application of Jones and Moberly, Serial No. 202,797, filed December 26, 1950, now abandoned.

The elastomer starting materials of this invention include homopolymers of conjugated dienes and copolymers of conjugated dienes with lesser amounts of one or more other compounds containing an active $CH_2=C<$ group. Examples of elastomers which are applicable include polybutadiene, polyisoprene, polypentadiene, polymethylpentadiene, and butadiene-styrene, butadiene-isoprene, butadiene-methyl acrylate, butadiene-ethyl acrylate, and isoprene-styrene copolymers. These polymers can be prepared by known polymerization methods such as mass or, preferably, emulsion polymerization.

It is generally preferred that the plastic materials herein described have an unsaturation in the range between 0 and 50 per cent with the range between 0 and 30 per cent being more frequently preferred.

The following examples further illustrate the nature of this invention, but the invention is not restricted to these examples.

*Example I*

A sample of 578 grams of polybutadiene prepared by emulsion polymerization at 41° F. and having a Mooney value (ML–4) of 41 was milled at 225° F. for 20 minutes and 310° F. for 10 minutes. The resulting rubbery material was dispersed in 7700 ml. of methylcyclohexane and charged to a hydrogenation reactor. A nickel on kieselguhr catalyst, prepared by reduction of 118 grams of 70 per cent Ni as NiO on kieselguhr and quenching with sufficient methylcyclohexane to make 775 ml., was added to the polybutadiene-methylcyclohexane dispersion. A 500 ml. portion of methylcyclohexane was used as a rinse to transfer materials to the reactor. The reactor was flushed with hydrogen, pressured to 330 p. s. i. g. with hydrogen, and the reaction mixture heated to 450° F. and the temperature maintained at this level for 2 hours. Hydrogen was added at intervals as needed. The pressure throughout the reaction varied from 330 to 500 p. s. i. g. The catalyst was removed by magnetic separation and the methylcyclohexane was removed by drum drying the product. The product had an unsaturation of 20.8 per cent. The unsaturation of the original polybutadiene, determined by the same method (iodine monochloride method described in Journal of Polymer Science, III, 66–84 (1948)) was 102 per cent.

The inherent viscosity of the polybutadiene before milling was 1.758 and after milling was 1.805.

*Example II*

A sample of 650 grams of the polybutadiene described in Example I was dispersed in 8000 ml. methylcyclohexane and charged to a hydrogenation reactor. A nickel on kieselguhr catalyst, prepared by reduction of 133 grams of 70 per cent Ni as NiO on kieselguhr and quenching with sufficient methylcyclohexane to make 850 ml. was added to the polybutadiene-methylcyclohexane dispersion. A methylcyclohexane rinse (1900 ml.) was used to transfer materials to the reactor. The reactor was flushed with hydrogen, pressured to 345 p. s. i. g. with hydrogen, and the reaction mixture heated to 450° F. and the temperature maintained at this level for 3.5 hours. Hydrogen was added at intervals as needed. The pressure throughout the reaction varied from 345 to 500 p. s. i. g. The catalyst was removed by magnetic separation and the methylcyclohexane was removed by drum drying the product. The product had an unsaturation of 33.5 per cent.

These results show that the polybutadiene which had been subjected to a hot milling step hydrogenated to a greater extent in less time than a sample which had not been hot milled. The results also show that the hot milling step effected substantially no change in inherent viscosity.

*Example III*

A sample of 302 grams of polybutadiene prepared by emulsion polymerization at 41° F. and having a Mooney value (ML–4) of 42 was milled at 235° F. for 20 minutes and 305° F. for 10 minutes. The resulting rubbery material was dispersed in 3763 ml. of methylcyclohexane and charged to a hydrogenation reactor. A nickel on kieselguhr catalyst, prepared by reduction of 61.7 grams of 70 per cent Ni as NiO on kieselguhr and quenching with sufficient methylcyclohexane to make 397 ml., was added to the polybutadiene-methylcyclohexane dispersion. A 500 ml. portion of methylcyclohexane was used as a rinse to transfer materials to the reactor. The reactor was flushed with hydrogen, pressured to 320 p. s. i. g. with hydrogen, and the reaction mixture heated to 450° F. and maintained at 450°–585° F. for 3.75 hours. Hydrogen was added at intervals as needed. The pressure varied from 320 to 500 p. s. i. g. The catalyst was removed by magnetic separation and the methylcyclohexane was removed by drum drying the product. The product had an unsaturation of 3.5 per cent. It was free flowing over a wide temperature range (see drawing, curve designated as No. 1) and could be extruded readily to give a product having a smooth, uniform surface.

*Example IV*

A sample of the 42 Mooney polybutadiene described in Example III was hydrogenated without hot milling, using somewhat different conditions, as follows: The reactor was pressured to 300 p. s. i. g. with hydrogen and the reaction mixture heated to 450° F. and the temperature maintained at this level for 3.25 hours. Hydrogen was added at intervals as needed. The pressure varied from 300 to 500 p. s. i. g. The product, which was recovered in the same manner as before, had an unsaturation of 31.3 per cent. This sample was free flowing over a much narrower temperature range than the sample which was hot milled prior to hydrogenation (see drawing, curve designated as No. 3) and when extruded had a very rough, uneven surface. This product is said to have a memory, i. e., it tends to return to its former shape. This behavior is responsible for the rough surface of the extruded material.

*Example V*

Samples of 35 grams each were molded at 200° F. and 1500 p. s. i. g. into discs having a diameter of 2¼ inches and a thickness of 9/16 inch. From these discs pellets were cut and the plasticity measured at different temperatures in a Goodrich plastometer.[1] The samples employed were as follows:

1. Polybutadiene (42 Mooney) hot milled and hydrogenated to give a product having an unsaturation of 3.5 per cent (described in Example III).
2. Polybutadiene (10 Mooney) hydrogenated without hot milling to give a product having an unsaturation of 7.2 per cent.
3. Polybutadiene (42 Mooney) hydrogenated without hot milling to give a product having an unsaturation of 31.3 per cent (described in Example IV).

The plasticity results are shown below and are further demonstrated by reference to the drawing.

| Temperature, °F. | Sample No. | Plasticity |
|---|---|---|
| 100 | 1 | 0.00121 |
|  | 2 | 0.00236 |
|  | 3 | 0.0037 |
| 125 | 1 | 0.0012 |
|  | 2 | 0.00366 |
|  | 3 | 0.00375 |
| 150 | 1 | 0.0048 |
|  | 2 | 0.00240 |
|  | 3 | 0.01249 |
| 160 | 1 | 0.00243 |
|  | 2 | 0.00473 |
|  | 3 | 0.0178 |
| 175 | 1 | 0.0253 |
|  | 2 | 0.0225 |
|  | 3 | 0.0215 |
| 185 | 1 | 0.477 |
| 200 | 2 | 0.452 |
|  | 3 | 0.274 |
| 250 | 2 | 0.458 |
|  | 3 | 0.284 |

As many possible embodiments may be made of this invention without departing from the scope thereof, it is

---

[1] Described in Ind. Eng. Chem., Anal. Ed. 2, 96 (1930).

I claim:
1. The process of producing a hydrogenated elastomer comprising subjecting a rubbery polymer of a conjugated diene to hot milling, hydrogenating the milled product, and recovering the resulting hydrogenated product, said product being capable of being extruded to produce a smooth surfaced article.
2. The process of claim 1 in which said polymer is a homopolymer of a conjugated diene.
3. The process of claim 1 in which said polymer is a copolymer of a conjugated diene and a compound other than a conjugated diene containing a $CH_2=C<$ group.
4. The process of claim 1 in which said elastomer is milled from 5 to 120 minutes at a temperature of from 200° to 600° F.
5. A process of preparing hydrogenated polybutadiene comprising hot milling rubbery polybutadiene, hydrogenating the milled product, and recovering the resulting hydrogenated product, said product capable of being extruded to produce a smooth surfaced article.
6. A process of preparing hydrogenated polybutadiene comprising milling polybutadiene at a temperature of 200° to 600° F. for a period of time of 5 to 120 minutes, dispersing the milled polybutadiene in a solvent, subjecting the polybutadiene to hydrogenation, recovering the resultant hydrogenated polybutadiene, and recovering the resultant product, said product being capable of being extruded to produce a smooth surfaced article.
7. The process of producing a hydrogenated elastomer comprising subjecting a rubbery polymer of a conjugated diene to hot milling, and hydrogenating the milled product, said milling including a primary milling and a secondary milling at a temperature higher than that of said primary milling, said milling being for the purpose of increasing the ease of hydrogenation.
8. The process of claim 7 in which said conjugated diene polymer is polybutadiene.

References Cited in the file of this patent

UNITED STATES PATENTS

| Number | Name | Date |
| --- | --- | --- |
| 2,333,242 | Fryling | Nov. 2, 1943 |
| 2,585,583 | Pinkney | Feb. 12, 1952 |